United States Patent [19]
Johnson et al.

[11] Patent Number: 6,084,827
[45] Date of Patent: Jul. 4, 2000

[54] DUAL-HEAD MULTIBEAM SONAR APPARATUS AND METHOD FOR TRACKING OBJECTS UNDERWATER

[75] Inventors: Robert L. Johnson, Pasco, Wash.; Robert Asplin, Port Moody, Canada

[73] Assignee: Battelle Memorial Institute, Richland, Wash.; a part interest

[21] Appl. No.: 09/138,040

[22] Filed: Aug. 19, 1998

[51] Int. Cl.[7] .................................................. G01S 15/66
[52] U.S. Cl. ........................................................ 367/103
[58] Field of Search ............................. 367/99, 103, 105; 702/152

[56] References Cited

U.S. PATENT DOCUMENTS

| | | | |
|---|---|---|---|
| 4,121,190 | 10/1978 | Edgerton et al. | 367/106 |
| 4,855,961 | 8/1989 | Jaffe et al. | 367/103 |
| 5,323,362 | 6/1994 | Mitchell et al. | 367/104 |

OTHER PUBLICATIONS

"Technological advances in riverine fish counting for coastal fishery management," Racca et al.

"Monitoring fish movement patterns in a reservoir using horizontally scanning split–beam techniques," Steig et al., J. Marine Sci., 53:435–441, 1996.

"Ultrasonic Tracer," Electronics, 30: 156–160, 1957.

"Video Sonar As A New Tool To Study Marine Mammals In The Wild: Measurements Of Dolphin Swimming Speed," Ridoux et al., Marine Mammal Science, 13(2):196–206 (Apr. 1997).

Primary Examiner—Daniel T. Pihulic
Attorney, Agent, or Firm—Stephen R. May

[57] ABSTRACT

An apparatus and method are provided for tracking the position in three dimensions of one or more objects underwater. Two multibeam sonar heads are positioned to operate in intersecting planes. The two multibeam sonar heads are synchronized to the time signals are emitted from a transmitter. The echoes of the emitted signals are detected by both heads and the data from the two sonar heads is transmitted to a computer that processes the data and can display the position of the one or more objects.

27 Claims, 10 Drawing Sheets

DUAL-HEAD MULTIBEAM SONAR APPARATUS AND METHOD FOR TRACKING OBJECTS UNDERWATER

This invention was made with Government support under Contract DACW 68-96-D-0002 awarded by the U.S. Army Corps of Engineers. The Government has certain rights in the invention.

FIELD OF THE INVENTION

The present invention relates generally to sonar apparatus and a method for tracking the position of objects underwater. More specifically, the invention relates to dual-head multibeam sonar apparatus for hydroacoustic tracking of objects such as fish.

BACKGROUND OF THE INVENTION

The U.S. Army Corps of Engineers and others involved in hydropower generation are actively developing techniques to move juvenile salmon past generators without entraining the fish through turbines (see, e.g., Northwest Power Planning Council, Columbia River Basin Fish and Wildlife Program, Portland, OR, 1994; National Marine Fisheries Service, "Biological opinion: reinitiation of consultation on 1994–1998 operation of the federal Columbia River power system and juvenile transportation program in 1995 and future years." 1995). Constructing fish bypasses around hydroelectric projects can cost millions of dollars, and yet the bypasses may not work as well as their designers had hoped. To develop methods for improving the survival of fish near hydroelectric projects, it is important to evaluate the behavior of the fish as they approach and pass through a hydroelectric project. In studying the behavior of fish near hydroelectric projects, it is desirable to be able to simultaneously track the position of multiple fish throughout an area in front of a fish bypass.

Conventional methods of tracking underwater objects are useful in many instances but suffer from various limitations. For example, conventional rotating tracking sonars collect data over relatively small areas. Thus, they may not provide a picture of fish behavior over the entire area of interest. Additionally, conventional methods are prone to biases such as the propensity of the systems to lock onto large fish, rather than small ones, and to track the large fish for a long period of time. This characteristic prevents the acquisition of new targets during the tracking event, and results in relatively small sample sizes over a given time period.

As compared to conventional sonars, multibeam sonars offer a relatively unbiased, coherent view of the water column. Other researchers have explored the use of a single head multibeam sonar to study the behavior of bottlenose dolphins (Ridoux et al., "A Video Sonar As A New Tool To Study Marine Mammals In The Wild: Measurements of Dolphin Swimming Speed," Marine Mammal Science, 13(2): 196–206 (1997)). This study included estimation of swimming speed relative to the bottom and to the tidal current. The study did not include the use of plural sonars or the tracking of fish in three-dimensions (3-D).

A non-conventional method for sonar detection was disclosed by Edgerton et al. in U.S. Pat. No. 4,121,190. In this method, underwater objects are detected using two single beam sonar arrays that are positioned orthogonally and that transmit sound waves from each sonar array. Objects that move through the relatively narrow areas sampled by either beam are detected and recorded in analog form on a chart recorder. The system described by Edgerton et al. could only pinpoint an object in three dimensions when the object was located at the point where the horizontal and vertical beams intersect. The system could not be used to track objects in 3-D. It was also disadvantageous because it used at least two transmitters to ping, and thus the combined beam pattern would be distorted due to interference.

Thus, there is a need for an apparatus and method for unbiased 3-D tracking of fish.

SUMMARY OF THE INVENTION

The present invention provides an apparatus and a method for the three dimensional tracking of at least one object underwater in which a first multibeam sonar head is located in a first plane, a second multibeam sonar head is located in a second plane that intersects the first plane, and at least one computer is used to process data from the two multibeam sonar heads. Each multibeam sonar head (hereinafter referred to as "sonar head") includes a transducer array and a microprocessor for receiving signals from the array. The system also includes a sound wave transmitter. The first sonar head and the second sonar head are synchronized; this means that (1) each head measures precisely the time at which a sound wave is emitted from a transmitter and the time at which an echo or echoes from the sound wave is/are received, and (2) signals received (i.e., an echo or echoes received from each sound wave) at each head is matched so that the data signals from each sonar head is properly correlated. After an echo or echoes has/have been received, the first sonar head and the second sonar head electronically transmit their data signals to a computer or to storage. A computer then processes the data signals to provide three-dimensional tracking of one or more objects.

The inventive apparatus and methods can provide numerous advantages including: fast operation that does not require physical rotation of a transducer or transition time between sample locations; no moving parts underwater—less can go wrong in field applications where flow and debris are major concerns; a relatively large volume can be studied with relatively fine three dimensional (3-D) resolution; the area studied can be sampled at a relatively high ping rate; tools for extracting real-time velocity and direction information can be built into the system; the sonar heads may have continuously variable time varying gain (TVG); and flexibility in the ability to set tracking parameters. The apparatus and methods are effective in turbid water and the invention is particularly advantageous for tracking the movement of fish near hydroelectric projects including the downstream movement of juvenile salmon, adult fallback and predator-prey interactions.

The apparatus and methods can be used to accurately track multiple objects simultaneously. The number of objects that can be simultaneously tracked may be limited by the available computing power, but, for example, with suitable computing power, thirty or more objects may be tracked simultaneously.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF PREFERRED EMBODIMENTS

Figure 1:
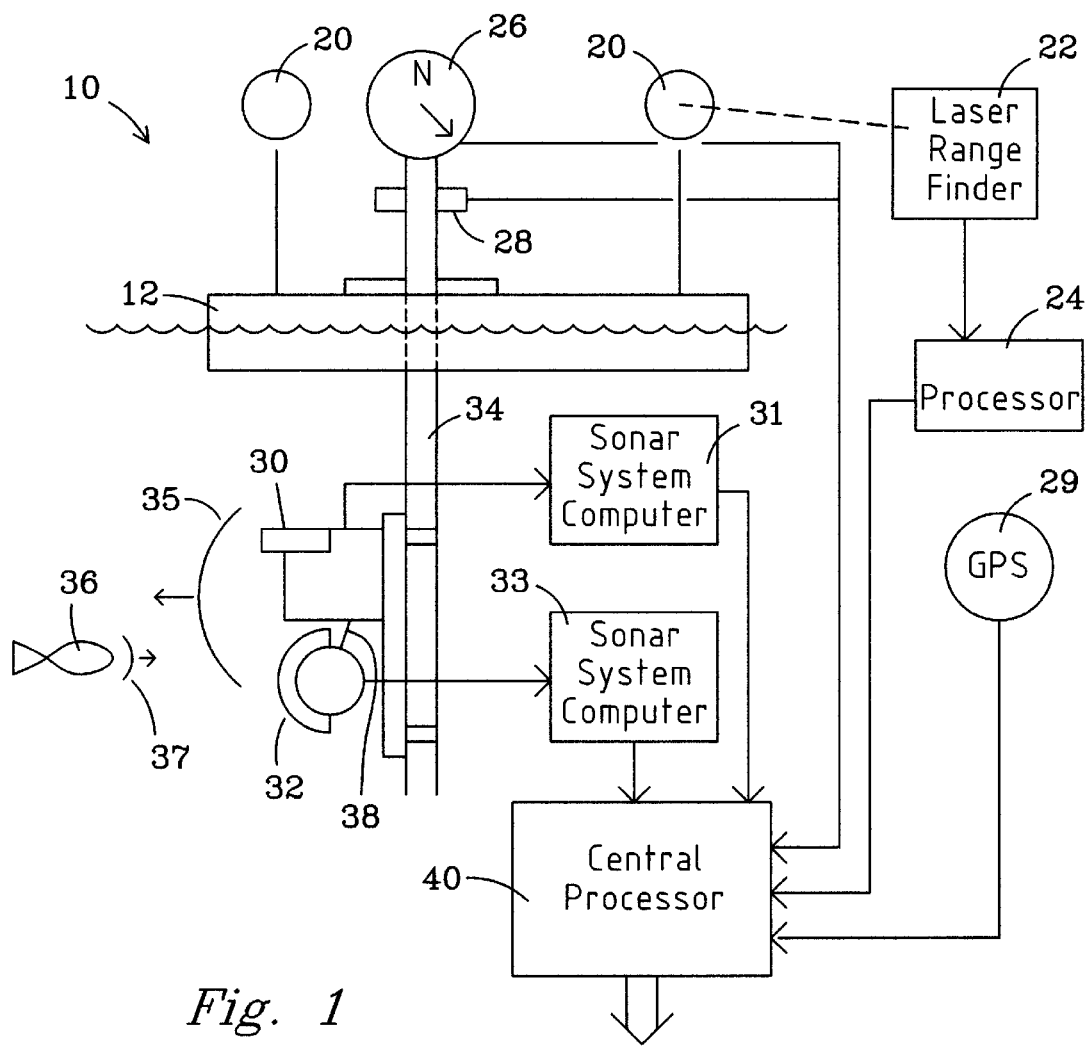
FIG. 1 is a schematic illustration of a dual-head multibeam sonar system for collecting tracking information.

A preferred embodiment of a system 10 to collect tracking data is schematically illustrated in FIG. 1. Various instrumentation is mounted on a barge 12 which can be moved to a desired location on a body of water.

The system typically includes instruments to measure the position of the transducers with respect to a hydroelectric project. The system may include a laser range finding system having prisms 20 mounted on the barge and on hydroelectric project structures (not shown), a laser range finder 22 and accompanying processor 24. The barge may also have a compass 26 and a pitch and yaw sensor 28 to provide information about the direction and orientation of the barge and thus the direction and orientation of transducers positioned beneath the barge. A receiver 29 for the Global Positioning System (GPS) may be included to provide position information and/or a highly accurate time-of-day. FIG. 1 is not drawn to scale and does not necessarily show the actual physical location of the equipment; for example, the laser range finder 22 and surface units (i.e., computers) 31 and 33 individually connected to each sonar are typically housed on the dam.

Two sonar heads 30 and 32 are mounted beneath barge 12 on pole 34. The sonar heads are positioned on intersecting planes, preferably orthogonally with one head horizontal 30 and one vertical 32. Sonar head 30 is connected to computer 31 and sonar head 32 is connected to computer 33. The system is most accurate when the sonar heads 30, 32 are positioned orthogonally; however, the system can work at other angles. Preferably, the heads are positioned at 90°±5° with respect to each other, and most preferably 90°.

Figure 2:
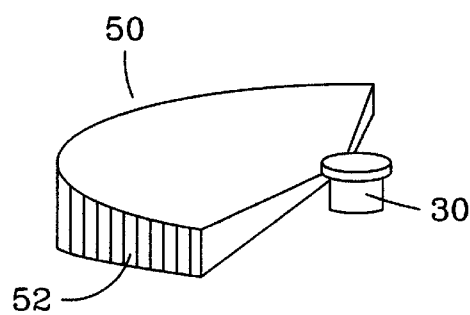
FIG. 2 illustrates the area sampled by each sonar head and segments within that area that correspond to individual beams.

A particularly preferred sonar head 30, 32 is provided in the SM2000 Multibeam Sonar system (available from Kongsberg Simrad Mesotech Ltd., 1598 Kebet Way, Port Coquitlam, B.C., Canada V3C5W9). Each SM2000 multibeam head has a transducer array containing 80 elements that form 128 beams that sample a volume defined by a 120°×20° wedge-shaped area projected out from the sonar head. FIG. 2 illustrates the area 50 (indicated by the shaded, wedge-shaped area) sampled by a sonar head 30. The total area sampled by each sonar head is divided electronically within the internal operation of the multibeam sonar system into 128 beams which appear as vertical "slices" 52. The areas sampled by two orthogonally positioned SM2000 Multibeam Sonars overlap a 20°×20° nominal volume of water that is analyzed by the present method. The total volume sampled may be limited by the limits of the body of water, such as the structure of a hydroelectric project, or by the effective range of the transducer arrays. The sonar heads 30, 32 described in the Examples section each sample a 20°×120° volume with a 20°×20° overlapping region; however, the sonar heads may instead, for example, be designed to sample a 40°×40° volume and have a 40°×40° overlapping region. Although the invention is not limited to a particular frequency of operation, in a typical application, the sonar head may emit sound at about 200 kHz. The current version of the SM2000 software and hardware permits a maximum of four objects to be tracked (profiled) per beam over the entire 128 beams for each sonar head 30, 32. This functional limit of the sonar system 10 permits tracking of 30 or more targets simultaneously depending on range. Target densities of 5 to 15 targets were typical during the testing described in the Examples section.

During operation, a sound wave 35 is emitted from a separate transmitter (not shown) or from one of the sonar heads (for example, the horizontal head 30). The sound wave 35 reflects off an object 36 such as fish and, if the object 36 is within the 20°×20° overlapping region, the reflected wave 37 is received by both sonar heads 30 and 32. Each multibeam sonar system (which typically includes a computer 31, 33 connected to each sonar head 30, 32) is then able to calculate the distance (by time of travel) and direction within a plane (by the beam within which the echo is recorded) of each object 36. Preferably, two sonar heads 30, 32 are disposed such that one head 30 is horizontal to the water's surface and one is vertical 32, and the horizontal head only emits a ping; this configuration has been found to result in less problems with surface reverberations.

This arrangement in which only one of the two sonar heads emits a sound wave is superior to systems in which two sonar heads emit sound waves. Pinging from both sonar heads 30, 32 would result in undesirable interference effects. The two beams would reinforce each other in some areas and cancel each other in other areas. There would be weak spots and hot spots rather than the desired uniform beam pattern. It is also believed that in confined areas, such as near structures of a dam, the use of both sonar arrays to transmit sound may cause excessive volume reverberations and structural echoes that lead to noisier results.

The present invention requires synchronization of the sonar heads 30, 32 such that both sonar heads 30, 32 know the time at which each sound wave (ping) is emitted. This is necessary for accurate distance measurements and for proper correlation of the two sonar heads 30, 32. For example, it is essential to know that sample number 125 from the horizontal sonar head 30 and sample number 125 from the vertical sonar head 32 were taken at exactly the same time. Without this synchronization, the data from the horizontal sonar head 30 cannot be accurately merged with the data from the vertical sonar head 32.

In the apparatus of FIG. 1, the sonar heads 30, 32 are synchronized through interconnect cable 38 which contains two wires, a common and a ready line. Although only one sonar head is ping-enabled, either sonar head 30, 32 could drive the ready line low (i.e., zero volts) and each sonar head 30, 32 could monitor the state of the ready line, low meaning not ready, high (typically five volts) meaning ready to transmit. In the stand by state, each sonar head 30, 32 would drive the ready line low. When a sonar head received a command from its control processor to ping, it would remove its control of the ready line and monitor the state of the ready line, waiting for it to go high before starting the next ping. With this scheme, the first sonar head to receive its ping command from the sonar system computer 31, 33 is forced to wait for the second sonar head to receive its ping command. They would then start their pings simultaneously. Note that this scheme is not limited to two heads, it will work with multiple sonar heads.

Data from all positioning systems 20/22/24, 26, 28, timing systems 29 (if any), and each sonar system are stored to disk or sent to central processor 40. The central processor 40 correlates the data flow with the GPS clock and integrates the data from both sonar heads 30, 32 into a single file for data processing.

The embodiment illustrated in FIG. 1 is a preferred apparatus that has been used to track fish; however, the inventive apparatus may have other configurations. For example, an integrated device can have sonar heads 30, 32 within a single container and a single computer replacing independent computers 31, 33. Synchronization may be inherently achieved in the integrated device because the single processor can control the ping rate and data collection from both sonar heads. In an integrated device, two sonar heads could be, for example, a first sonar head defined as 40 elements in a horizontal transducer array with accompanying microprocessor(s) and a second sonar head defined as 40 elements in a vertical transducer array with accompanying microprocessor(s)—all of which are located within a single container. The system can include a separate sound transmitter, or either sonar head 30, 32 or selected elements within the transducer arrays could be used to transmit sound waves.

Figure 3:
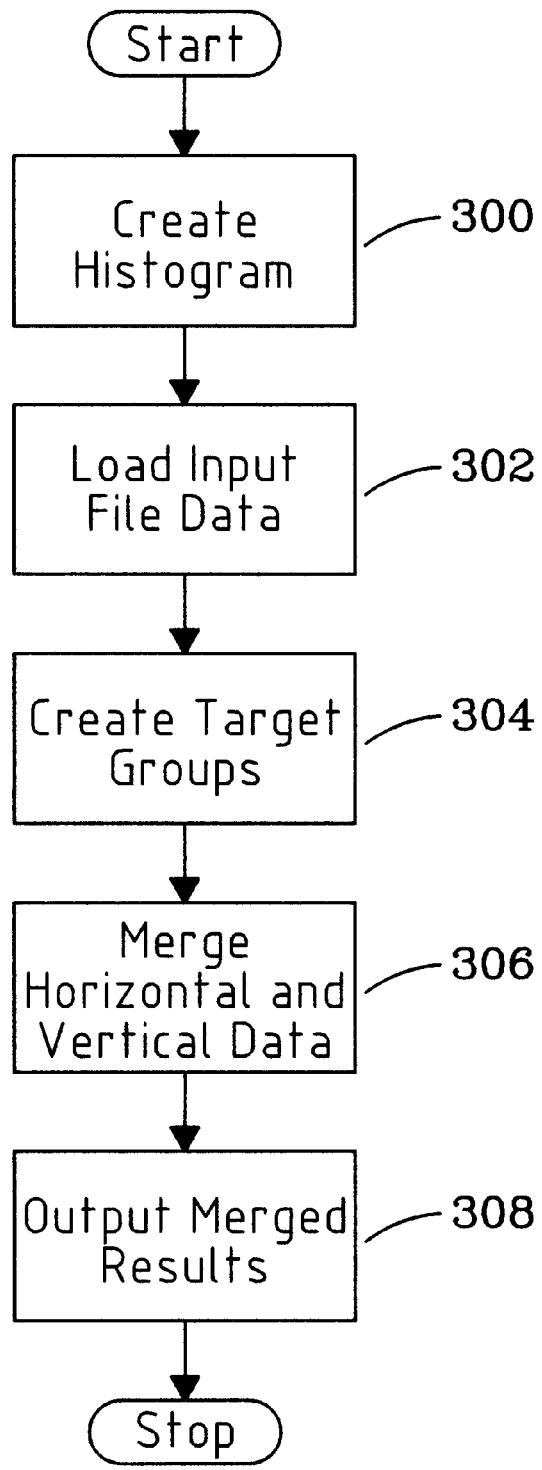
FIG. 3 is a simplified flow diagram illustrating an algorithm for processing data from the dual-head multibeam sonar system.
Figure 4:
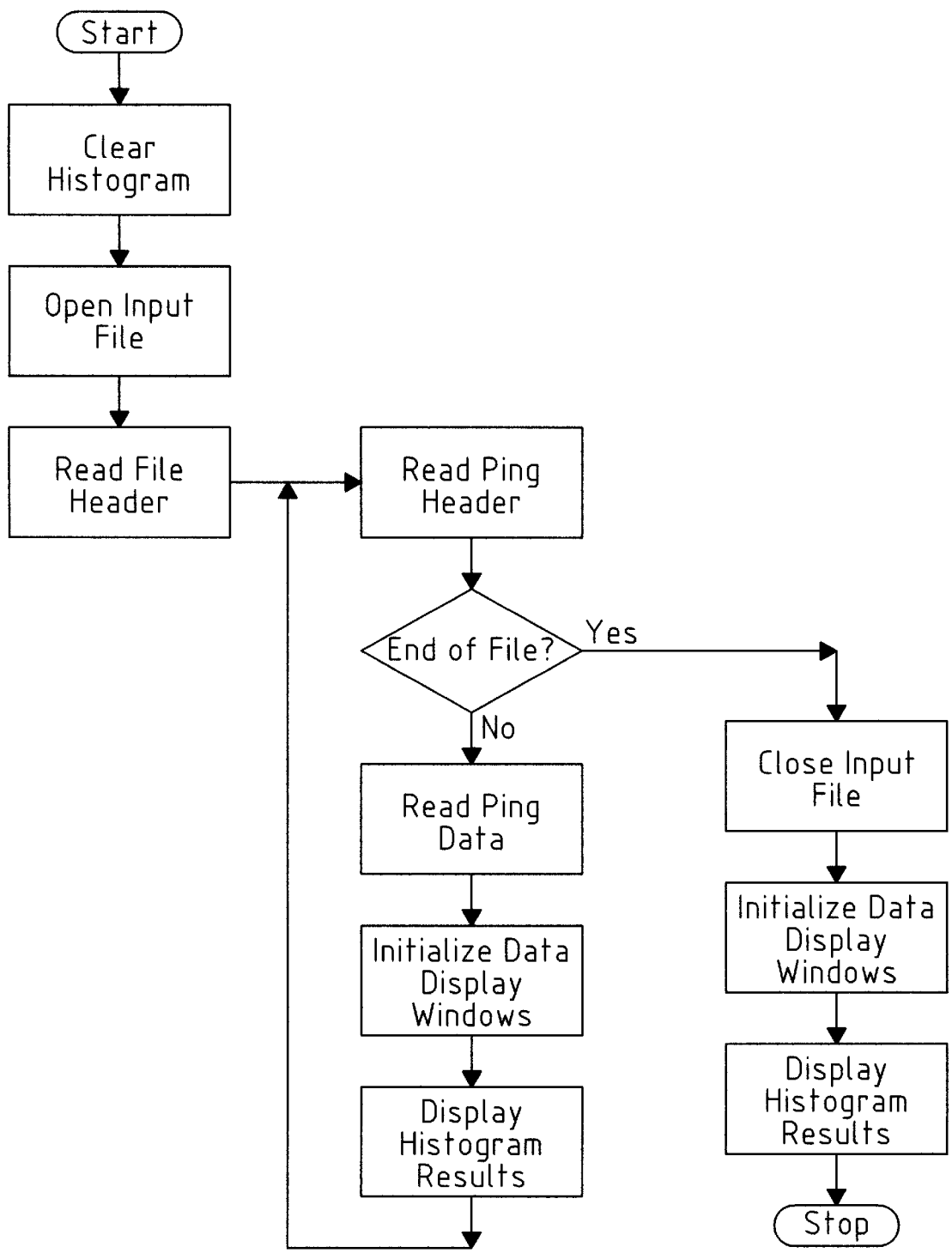
FIG. 4 is a flow diagram illustrating an algorithm for inputting data from each sonar head.

An overview of a preferred processing algorithm is shown in FIG. 3. Subroutines within this preferred process are shown in FIGS. 4–8.

FIG. 3 is a flow chart of a preferred data processing algorithm. Input file and processing parameters have been previously specified in the user interface (not shown). The Create Histogram box 300 refers to the step in which an input file is scanned to create a histogram of all hits at distance and beam number combinations over all time in the input file. In Load Input File Data 302, file header and ping headers are read into storage to be subsequently passed to the outfile. Ping data is read into two 3-D arrays (horizontal and vertical) having dimensions of time, distance and beam number. In the Create Target Groups step 304, target groups are identified and marked based on spatial proximity of hits in the horizontal and vertical data sets. In Merge Horizontal and Vertical Data 306, hits in the horizontal and vertical data sets that occur at the same time and distance are identified and matched. In the Output Merged Results step 308, an output file is created containing target IDs and target locations at each time. Spherical to cartesian coordinate conversion may be performed for each target location.

In the Create Histogram step, the data from each of the sonar units may be used to create a histogram showing the number of target hits detected at each distance (typically data resolution for distance measurements is about 0.2 meter) in each of the 128 possible beams (typically each beam has a width of about one degree). Since only a fraction of the beams of each sonar unit overlap, typically only 30–40 beams of data from each sonar unit are transmitted to the third computer. The output routine is illustrated on FIG. 4. The results from the histogram and an appropriate cutoff value specified by the user may be used subsequently to filter out stationary objects such as structural features of a hydroelectric project.

Figure 5:
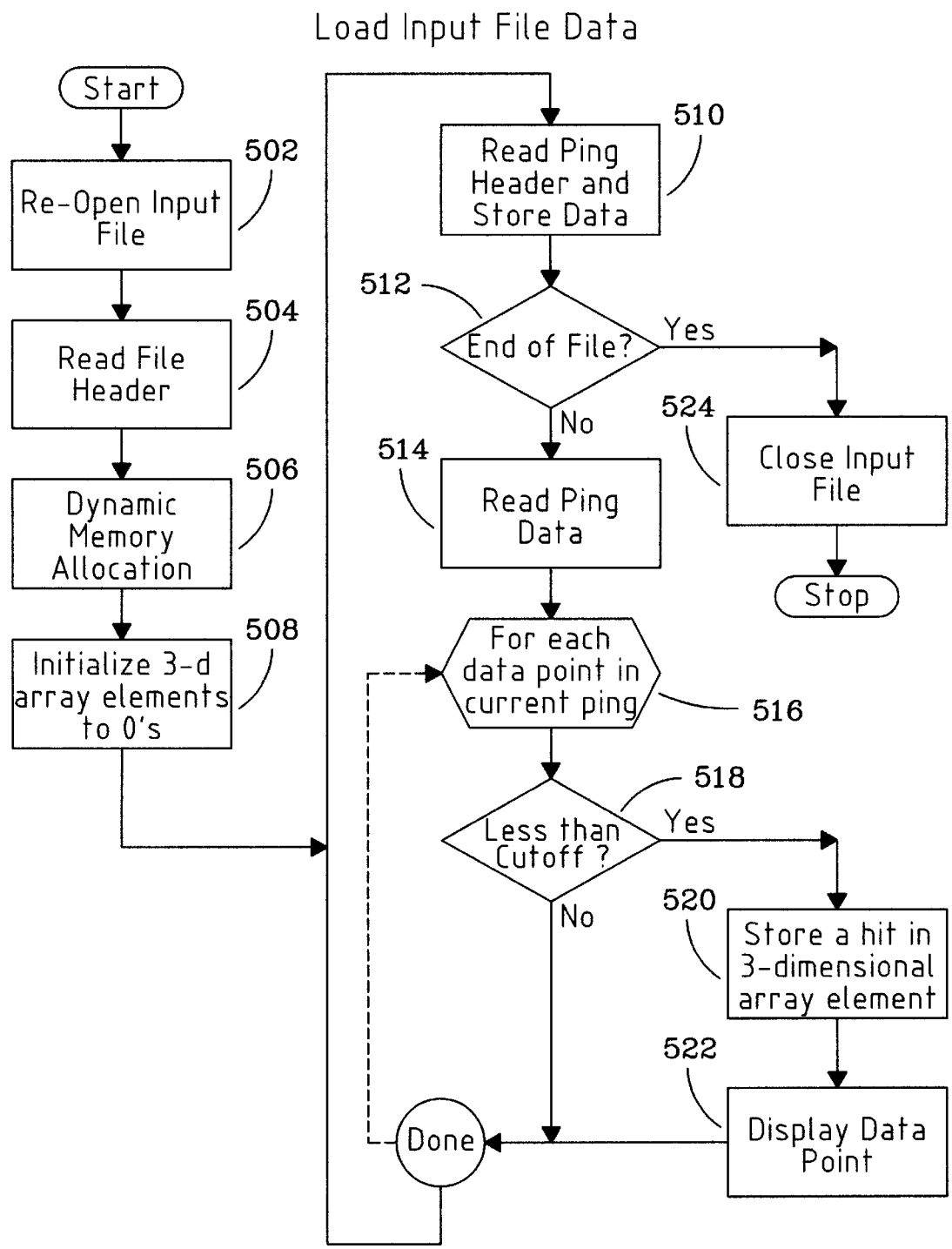
FIG. 5 is a flow diagram illustrating an algorithm for loading input data into a three-dimensional array.

FIG. 5 illustrates a method of filtering and storing data from each of the sonar units. During Dynamic Memory Allocation 506, storage is allocated for ping data and ping header parameters that will be passed to the output file. The amount of allocation is based on total ping count. Each data point is sorted as a function of time, distance and beam angle. Stationary objects are removed from the data by the high pass filter 518, in which, for the current distance and beam angle, if the ratio of the histogram value to the total time is less than the cutoff value specified by the user, then the input data is loaded into the 3-D array having the dimensions of time, distance and beam number. Hits that are stored in the 3-D array 520 are assigned the value 1.

Figure 6:
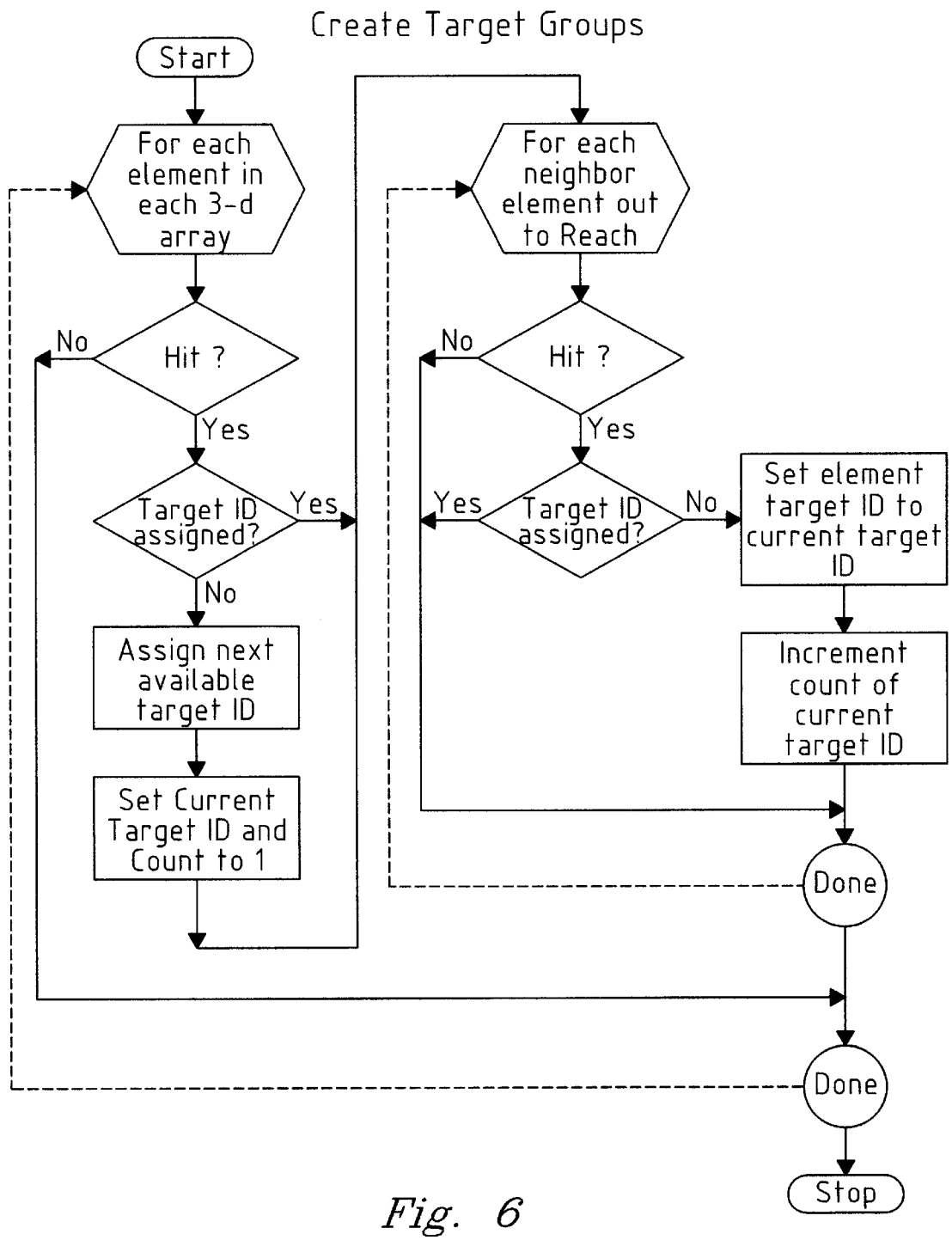
FIG. 6 is a flow diagram illustrating an algorithm for assigning signals in a three-dimensional array to individual targets.

Each element in the 3-D array can be thought of as representing a particular time, distance and beam angle combination in the data set. After loading the input data, each array element will be assigned either the value zero (no target) or the value one (target hit). As illustrated in FIG. 6, each array element is processed to identify whether it is part of a target group. Elements with a value of zero are not part of a target group. Elements with a value of one are analyzed by assigning them target identification numbers (target IDs) greater than one and by looking at other elements within a user-specified "reach" (i.e., within a specified number of array elements in each of the array's three dimensions from the first analyzed element) to see if other elements within the specified reach also contain the value of one. If any of the elements within the specified reach contain the value of one, then these elements are assigned the same target ID as the array element that is currently being processed. Subsequently analyzed array elements within the specified reach are assigned the same target ID. This process may be reiterated for each array element in the complete data set. The result is for both horizontal and vertical arrays to contain target IDs that identify target groups within each array.

Figure 7A:
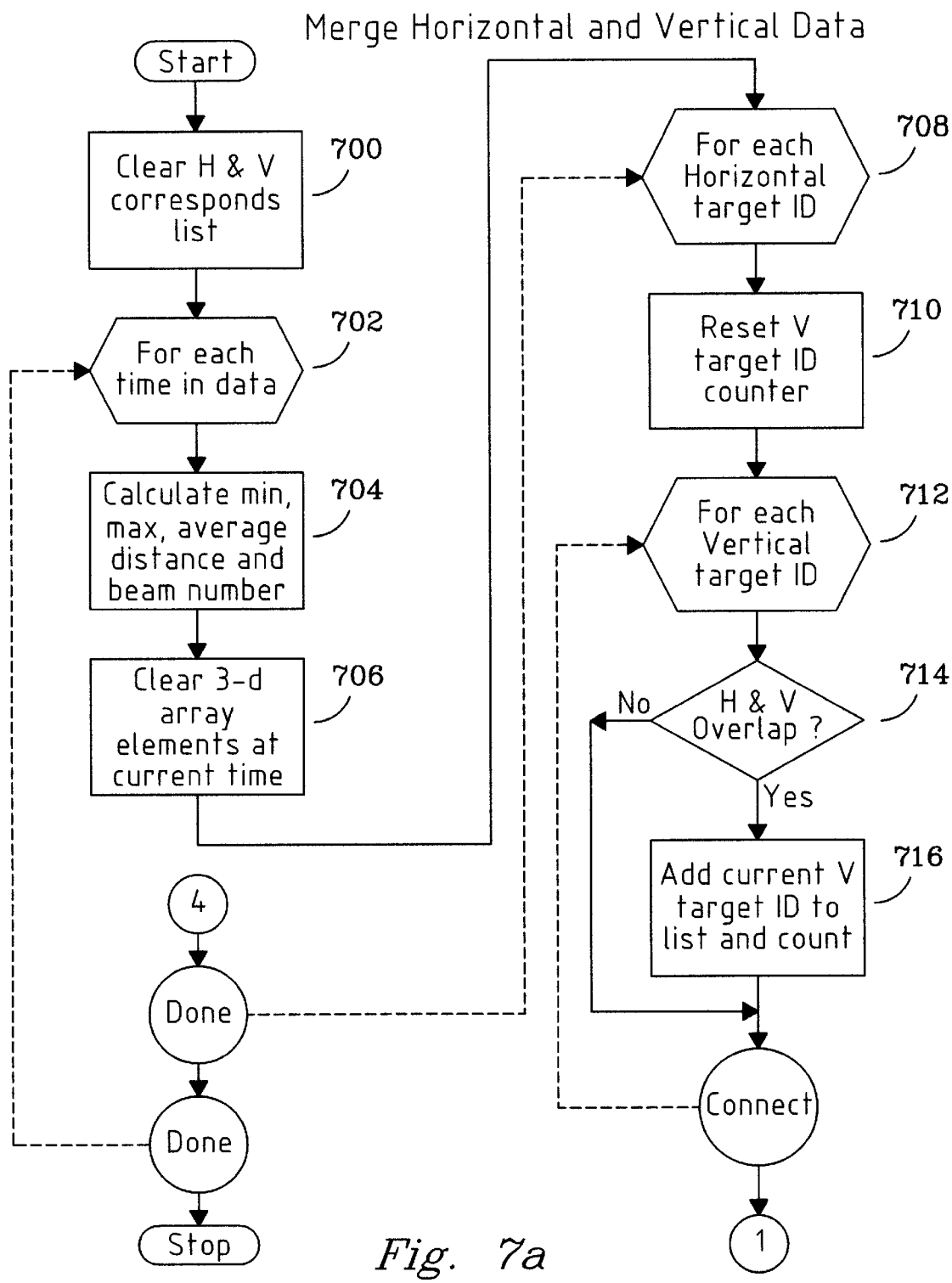
FIG. 7a is a flow diagram illustrating an algorithm for merging the data from vertical and horizontal sonar heads and assigning individual targets.
Figure 7B:
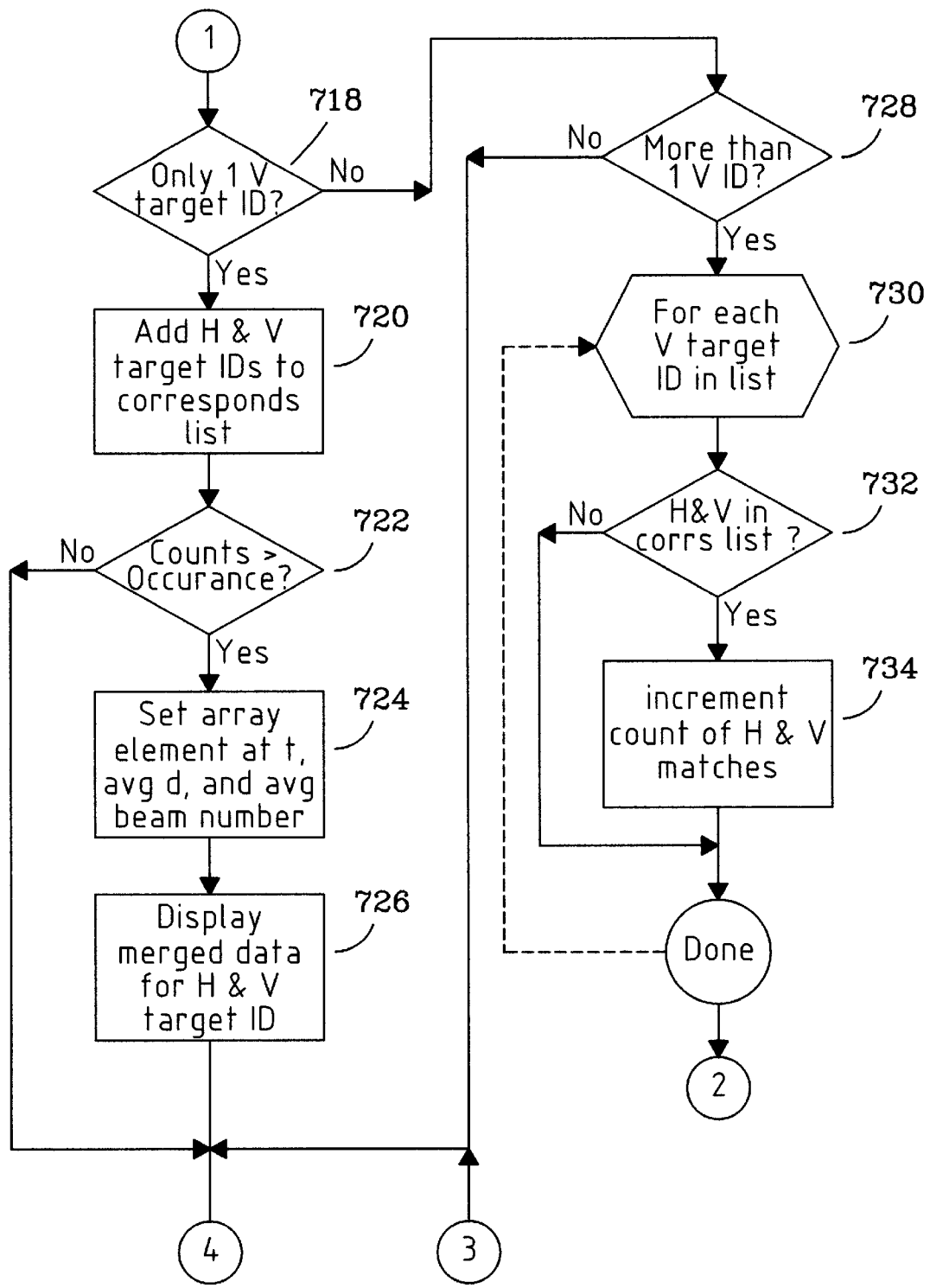
FIG. 7b is a continued flow diagram illustrating an algorithm for merging the data from vertical and horizontal sonar heads and assigning individual targets.
Figure 7C:
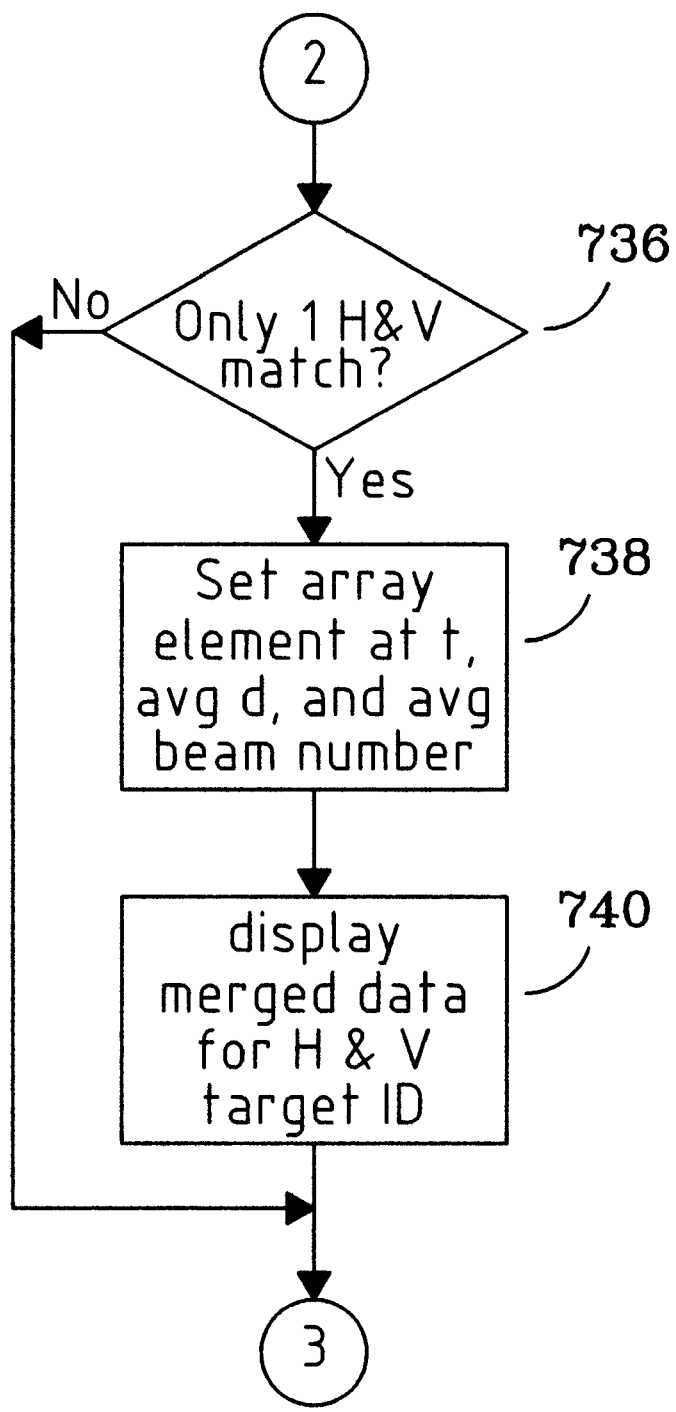
FIG. 7c is a continued flow diagram illustrating an algorithm for merging the data from vertical and horizontal sonar heads and assigning individual targets.

FIGS. 7a, 7b, and 7c illustrate a process in which data from the horizontal and vertical sonar units are merged. For each target ID at each time, the minimum, maximum and average distance and the minimum, maximum and average beam number are calculated in 702. Then each target ID in the horizontal data at the current time is compared to each possible target ID in the vertical data at the current time. If there is any overlap in the minimum and maximum distances for each horizontal and vertical target ID pair in 708 (i.e., the target appears at the same distance in both data sets) then the vertical target ID is added to a list of target IDs that can potentially match the current horizontal target ID in 710. There are three possible situations for each horizontal target ID.

First it is possible that there are no vertical target IDs that occur at the current time and distance as the horizontal target (no in 712 and no in 722). In this case there is no match and the current horizontal target ID cannot be associated with any vertical targets.

Second it is possible that there is exactly one vertical target ID that occurs at the same time and distance as the current horizontal target ID (yes in 712). In this case a match is assumed, and the target ID pair is stored in a list of horizontal and vertical target IDs that have been successfully associated (714). Next, the total number of occurrences (the target ID count) of each target ID (horizontal and vertical) over all time in the input data sets is compared to a user specified minimum occurrences value in 716. If the horizontal and vertical target ID counts are both greater than the specified minimum occurrences value then all occurrences of the horizontal and vertical target IDs at the current time are replaced in the 3-D array with a single occurrence of the target ID at the average distance and average beam number previously calculated for each target ID (718). Note that initially the horizontal and vertical target IDs in the associated pair are generally different. When they are replaced in the 3-D array at an average distance and beam number, the target ID placed in both horizontal and vertical arrays is the same. This allows corresponding pairs to be readily identified later when results are being output to file.

In the third case, there are two or more vertical target IDs that occur at the same time and distance as the current horizontal target ID (no in 712 and yes in 722). In this case the list of horizontal and vertical target IDs that have been previously associated is consulted. As the list of previously associated target IDs is consulted for each horizontal and vertical target ID pair there are three possible outcomes. First if the current horizontal target ID has never successfully been associated with any of the two or more vertical target IDs (always no in 724 and no in 728), then it is uncertain which vertical target ID to associate with the current horizontal target ID and no association is made. Second, if the current horizontal target ID has previously been associated with only one of the two or more vertical target IDs (yes once in 724 and yes in 728), then it is assumed that the pair can be associated once again. Again all occurrences of the horizontal and vertical target IDs at the current time are replaced in the 3-D array with a single occurrence of the target ID at the average distance and average beam number previously calculated (730). Third, if the current horizontal target ID has previously been associated two or more of the two or more vertical target IDs (yes more than once in 724 and no in 728), then again it is uncertain which vertical target ID to associate with the current horizontal target ID and no association is made.

Figure 8:
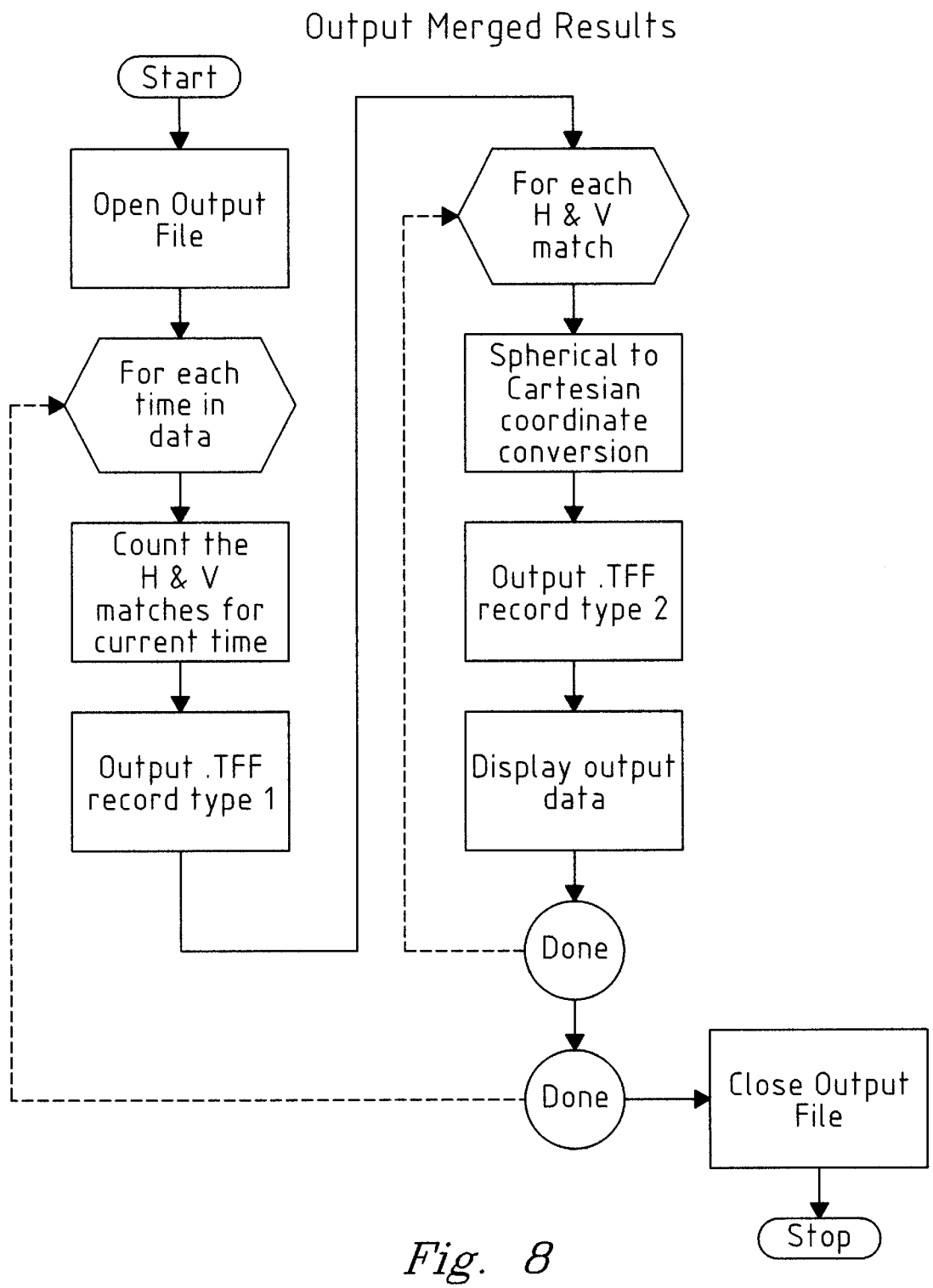
FIG. 8 is a flow diagram illustrating an algorithm for outputting the merged results into a format for conversion to a display.

The merged results may be used to generate an output file as shown in FIG. 8. For each time (or ping) in the data, the date, time of day, and the number of identified targets (i.e., the number of horizontal and vertical positive matches) are output to file. Since the data from the sonar units is in polar coordinates (i.e., an angle and a distance), each target position is converted to Cartesian coordinates with the origin at the sonar heads, and the data output to file for the current time.

The output data from the preferred process described above can be used to generate a variety of displays showing fish behavior throughout the water volume being studied, including: average fish velocity plots and sector maps, fish population and distribution at any particular time or time interval, and animations showing simultaneous tracking of individual fish. The output tracking information can also be stored along with the conditions present when the data was acquired such as weather, dam operations, water velocity, and structural configuration.

EXAMPLES

Testing was conducted in front of a Surface Bypass Collector (SBC) on the Lower Granite Dam on the Snake River in the state of Washington, U.S.A. The SBC is a steel structure attached to the front of a dam to provide an avenue of passage or collection for downstream smolts as opposed to going through the turbines of the powerhouse.

Two multibeam sonar arrays were mounted on a vertical pole connected to a barge such that the arrays were located about 2.5 meters (m) beneath the water's surface and oriented orthogonally with one array horizontal and one vertical. The sonar arrays were SM2000 Multibeam Sonar systems (available from Kongsberg Simrad Mesotech Ltd., 1598 Kebet Way, Port Coquitlam, B.C., Canada V3C5M5). Each multibeam system employed a complex transducer with 80 elements that formed 128 beams that sampled a total area of 120° by 20°. The two sonar heads were linked by a 1 m long interconnect cable. The systems were synchronized as described in the Detailed Description section. The received signals were digitized in the underwater sonar head and sent to a surface processing unit via a digital telemetry link.

Also located on the barge was a combined compass and tilt sensor (Heading Smart Sensor™ available from Applied Microsystems Ltd., 2035 Mills Rd., Sidney, British Columbia, Canada V8L 5X2), and a prism for a laser range finder. A link-up to the Global Positioning Satellite provided a highly accurate time of day to the third computer but was not used to synchronize pinging of the sonar arrays.

The position of the sonar arrays relative to the hydroelectric project were obtained using a Fanbeam™ MKIII laser radar system (obtained from Measurement Devices Ltd., Houston, Tex.). The system comprised a rotating head mounted on a gearbox and a gallium arsenide laser. The unit was programmed and controlled by a remote PC. Prisms were mounted on objects of interest and reference points and Fanbeam positional data was collected continuously at approximately 1-second intervals. The technical specifications, provided by Measurement Devices Ltd., are listed in Table 1.

TABLE 1

Fanbeam MKIII technical specifications

| Parameter | Limits |
| --- | --- |
| scan speed | 3° to 50°/sec |
| scan range | Up to 360° |
| range resolution | ±10–20 cm (dependent on target and scan rate) |
| angular resolution | better than ±0.02° |
| maximum range | greater than 2000 m (weather dependent) |

The Fanbeam™ system used prisms on each target of interest to reflect laser light back to the source. Two prisms were positioned on either end of the barge with the sonar arrays positioned on a pole between the prisms. The Fanbeam™ tracked and recorded positions of the prisms approximately every second.

System control and data collection were managed by two personal computers housed in an acoustic equipment room on a deck that is part of the dam. One of the computers was dedicated to the horizontal array and one to the vertical array. The horizontal and vertical systems operated independently except for a clock synchronization established at the onset of data collection. Data from the two SM2000 Sonar unit personal computers in Multibeam Profile Binary (MPB) format (i.e., the format generated by software supplied with the SM2000 sonar), the compass, pitch and yaw sensor, Fanbeam and GPS systems were collected by a third computer and stored on a Jaz™ drive(available from Iomega Corp., Roy, Utah 84067). The collected data was processed by software developed using Borland C++ Builder and the processing is illustrated in the flow diagrams shown in FIGS. 3–8.

Raw MPB data contained a data packet for each ping or time interval. Each packet contained information about the beam angle and range from the transducer where targets were found for a particular ping. Targets were classified during data collection as locations in range in a particular beam that met a number of profiling criteria consisting of: minimum/maximum amplitude; minimum/maximum range; minimum/maximum beam angle; pulse width and ping interval. A series of targets that satisfied particular tracking parameters was presumed a fish track. The first step in processing the data files stored on the third computer's Jaz drive was to create a histogram of targets that occur in the data over all possible pings for all possible beam angles, and for all possible distances from the transducer. For example, given a third computer data file that contains 1000 pings or data packets, the histogram might show that at a beam angle of 82 degrees and a distance of 19 m from the transducer, targets were present in 127 of the possible 1000 pings.

In the next processing step a 3-D array of integer values was dynamically allocated for the horizontal and vertical data contained in the third computer input files. The first dimension of these arrays was time. This dimension corresponded to the total number of pings, or data packets, in the input file. The second dimension of these arrays was distance, that is, the distance from the transducer to the target. The user specified the range of distances that needed processing. The third dimension was beam angle or beam number. The total number of beams in both the horizontal and vertical data sets was read and recorded as the histogram was being created. All elements in this array were initially set to zero.

The first filtering occurred as the input data file was loaded onto the newly allocated 3-D arrays. As each target in the data was read from the input data file, the beam angle and distance from the transducer for the current target was used to look up the value in the histogram for that combination of particular beam angle and distance from transducer. The total number of time units (pings) in the data file was divided into this value. The result was the percentage of time that targets occur at a particular beam angle and distance from transducer. If this percentage was less than a specified cutoff, the target was loaded into the 3-D array. If the percentage was higher than the cutoff, then the target was assumed to be a static object, such as the SBC, and the target was left out of the 3-D array. The result was a high pass filter. Targets that passed the filter were loaded into a 3-D array and assigned the appropriate time, distance, and beam angle array element with a value of 1. When loading was complete, the 3-D array for each input file was filled with 1's and 0's representing targets and areas of no activity, respectively.

The next step was to group the targets, based on their proximity in time, distance, and beam angle. The routine used to perform this grouping started at time 0 and proceeded through the 3-D array looking for targets at all possible distance-from-transducer and beam angle combinations. Target IDs were assigned to the 3-D array elements to identify target groups. As processing continued, two possibilities existed for each of the 3-D array element values; if the value of the array element was 1, no target ID was assigned yet and a new target ID was obtained; otherwise if the value of the array element was greater than1 then a target ID had already been assigned. Then for the current array element and corresponding target ID, adjacent array elements were checked for the presence of a 1, in which case the 1 was replaced with the current array element's target ID. If the adjacent elements already had target IDs assigned, they were left unchanged. As this routine went through time in the 3-D array, it would create strings of adjacent targets, all with the same target ID, thus creating groups of targets in each data file.

Certain parameters were used to determine how far in each dimension in the 3-D array the routine would look for adjacent targets. These user-specified parameters for each dimension are called reach parameters. If reach was greater than 1, then gaps between adjacent targets were possible. The number of times a given target ID was used was counted. This counter value was used later as a filter, based on the number of occurrences of a given target ID.

The next processing step merged the filtered horizontal and vertical input data. The minimum occurrences low pass filter was also applied during this processing step. This routine started at time 0 and simultaneously stepped through both the horizontal and vertical 3-D arrays. For each time value, the routine identified target groups in both the horizontal and vertical data that occurred at the same distance from the transducer. A test determined whether the matching target IDs from each data set occurred as often as the user-specified minimum occurrence parameter. The count for each of the target IDs that were assigned in the target-grouping step determined the total number of occurrences of each target ID. If these count values for both horizontal and vertical data sets was greater than the number specified by the user then the results of the matching pair of target IDs is stored.

In order to calculate valid 3-D data points (ordered triplets) to output, corresponding data (for example a target at some beam angle) is required for the current time and distance in both the horizontal and vertical data sets. If corresponding data were not in both data sets, a valid 3-D data point could not be calculated.

The next processing step was to generate a Tracked Fish Format (TFF) output file. Output was generated for the current time. To do this, the current distance (the same for both horizontal and vertical data sets), the average horizontal beam angle, and the average beam vertical beam angle were combined to produce the ordered triplet output for the current time value. The ordered triplet was calculated by performing a spherical to Cartesian coordinate system conversion. The ordered triplet output was then written to an appropriate file format for input to the desired visualization software.

Figure 9:
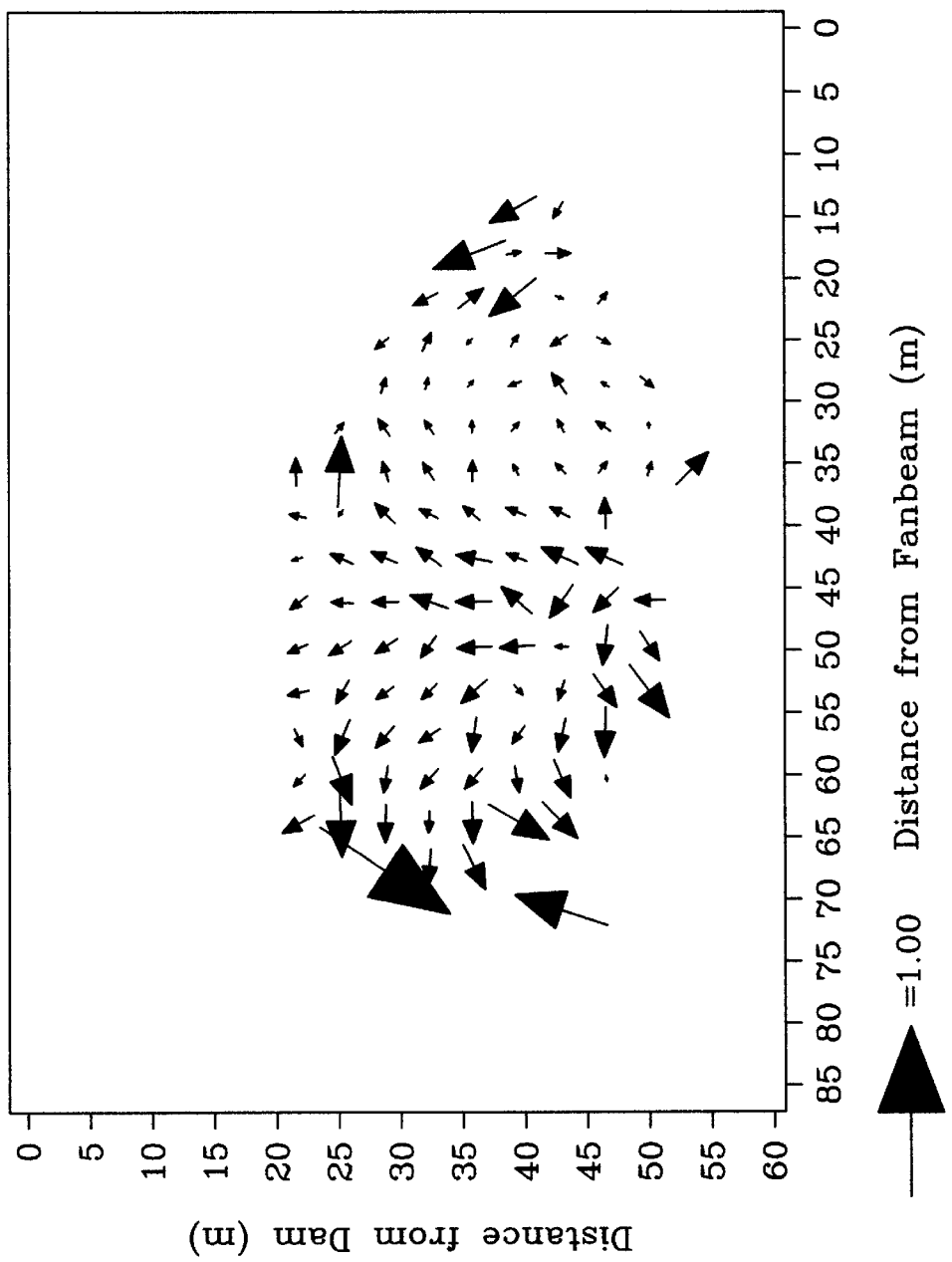
FIG. 9 is a plan view showing averaged fish velocity vectors in front of a dam based on data accumulated from 0 to 12 m in depth from the water's surface.

The results of the 3-D positional tracking were displayed in a variety of formats including average fish velocity vector plots and sector maps for both horizontal and vertical perspectives, tabular pivot tables showing average speed and number of targets per sample bin within the sampled region, and a 3-D visualization/animation capable of playing back the sonar data in a scene comprised of a 3-D perspective of the face of the dam, water surface, and bottom. An example of an average velocity vector display is shown in FIG. 9. This plan view display was based on data collected within 12 m of the water surface. The bottom left of the display indicates the scale with the arrow equaling 1 m/s. As shown in FIG. 9, fish that come in with the flow at center (corresponding to an opening in the SBC mounted on the front of the dam—not shown) slow and veer off to the sides as they approach the front of the dam. Similarly, fish moving in from the side also veer away from the dam. This movement away from the dam may be due to noise at the front of the dam, possibly caused by the SBC gates, vortices, or turbine noise. Other stimuli may include lights or other visual cues, and aberrant flow fields.

The animation was created using C++code with the software package Open Inventor™ (available from Silicon Graphics, Inc., Mountain View, Calif., U.S.A.). The structural environment of the hydroelectric project was TFF data inputted resulting in animated tracking of fish as they moved around the structural environment. The user may rotate and zoom in on the scene to look at the fish from various perspectives and display tracked fish histories based on an interpolated spline along the fish track.

CLOSURE

While a preferred embodiment and examples of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed:

1. An apparatus for the three dimensional tracking of at least one object underwater comprising:
   a sound wave transmitter;
   a first multibeam sonar head located in a first plane;
   a second multibeam sonar head located in a second plane that intersects said first plane; and
   a computer;
   wherein said first multibeam sonar head and said second multibeam sonar head are synchronized;
   wherein, during operation, said sound wave transmitter emits sound waves, and said first multibeam sonar head and said second multibeam sonar head receive sound waves reflected from objects;
   wherein, during operation, said first multibeam sonar head and said second multibeam sonar head electronically transmit data; and
   wherein said computer is capable of processing said data to provide three dimensional tracking of said at least one object.

2. The apparatus of claim 1 wherein there is only one sound wave transmitter.

3. The apparatus of claim 2 wherein said first plane and said second plane are oriented at an angle of 90±5° with respect to each other.

4. The apparatus of claim 3 wherein said first multibeam sonar head comprises said sound wave transmitter.

5. The apparatus of claim 4 wherein said second multibeam sonar head is ping-disabled; and said first multibeam sonar head and said second multibeam sonar head are synchronized via an interconnect cable.

6. The apparatus of claim 3 wherein said first and second multibeam sonar heads are located within a single unit and a single computer controls both of said first and second multibeam sonar heads.

7. The apparatus of claim 2 wherein said first and second multibeam sonar heads are located less than one meter apart.

8. The apparatus of claim 7 wherein said first and second multibeam sonar heads are located on a mobile platform.

9. The apparatus of claim 8 further comprising instruments to measure the position of the sonar arrays.

10. The apparatus of claim 8 wherein said mobile platform is located within 100 meters of a hydroelectric project.

11. The apparatus of claim 9 wherein said instruments comprise a laser range finder.

12. A method for the three dimensional tracking of at least one object underwater comprising:
    providing a sound wave transmitter;
    providing a first multibeam sonar head located in a first plane;
    providing a second multibeam sonar head located in a second plane that intersects said first plane; and
    providing a computer;
    emitting a sound wave from said sound wave transmitter;
    wherein said first multibeam sonar head and said second multibeam sonar head are synchronized;
    wherein said first multibeam sonar head and said second multibeam sonar head receive sound waves reflected from objects;
    wherein said first multibeam sonar head and said second multibeam sonar head electronically transmit data; and
    wherein said computer processes the data and provides three dimensional tracking of said at least one object.

13. The method of claim 12 wherein only one sound wave transmitter is used to emit sound waves.

14. The method of claim 13 wherein said first plane and said second plane are oriented at an angle of 90±5° with respect to each other.

15. The method of claim 14 wherein said first multibeam sonar head comprises said sound wave transmitter and wherein said first multibeam sonar head and said second multibeam sonar head are synchronized via an interconnect cable and said first head does not emit a sound wave until said second sonar head transmits a ready signal via said interconnect.

16. The method of claim 14 wherein said first multibeam sonar head and said second multibeam sonar head are controlled and synchronized by a common processor.

17. The method of claim 14 wherein the at least one object is a fish.

18. The method of claim 14 wherein more than one object is being tracked.

19. The method of claim 18 wherein the more than one object are fish that are being tracked simultaneously in the vicinity of a hydroelectric project.

20. The method of claim 17 wherein said first multibeam sonar head and said second multibeam sonar head are located on a mobile platform.

21. The method of claim 20 further comprising:
    providing a laser range finder that precisely locates the position of the first and second multibeam sonar heads relative to said hydroelectric project.

22. The method of claim 14 wherein said first multibeam sonar head is oriented horizontally with respect to the water s surface, and said first multibeam sonar head comprises the sound wave transmitter.

23. The method of claim 14 wherein said data from said first multibeam sonar head and said second multibeam sonar head are processed independently to generate a three dimensional array having dimensions of distance, beam angle and time.

24. The method of claim 23 wherein data in the three dimensional array is passed through a high pass filter to remove static objects.

25. The method of claim 23 wherein data signals that are adjacent to each other in the three dimensional array are identified as a single target.

26. The method of claim 25 wherein the independently processed data is merged, and targets from the two separate multibeam sonar heads that have the same distance at the same time are matched.

27. The method of claim 26 wherein the at least one object are fish and wherein the method is performed in the vicinity of a hydroelectric project, and further comprising converting the position data into coordinates relative to the hydroelectric project; and displaying the movement of the fish as a function of time.

* * * * *